UNITED STATES PATENT OFFICE.

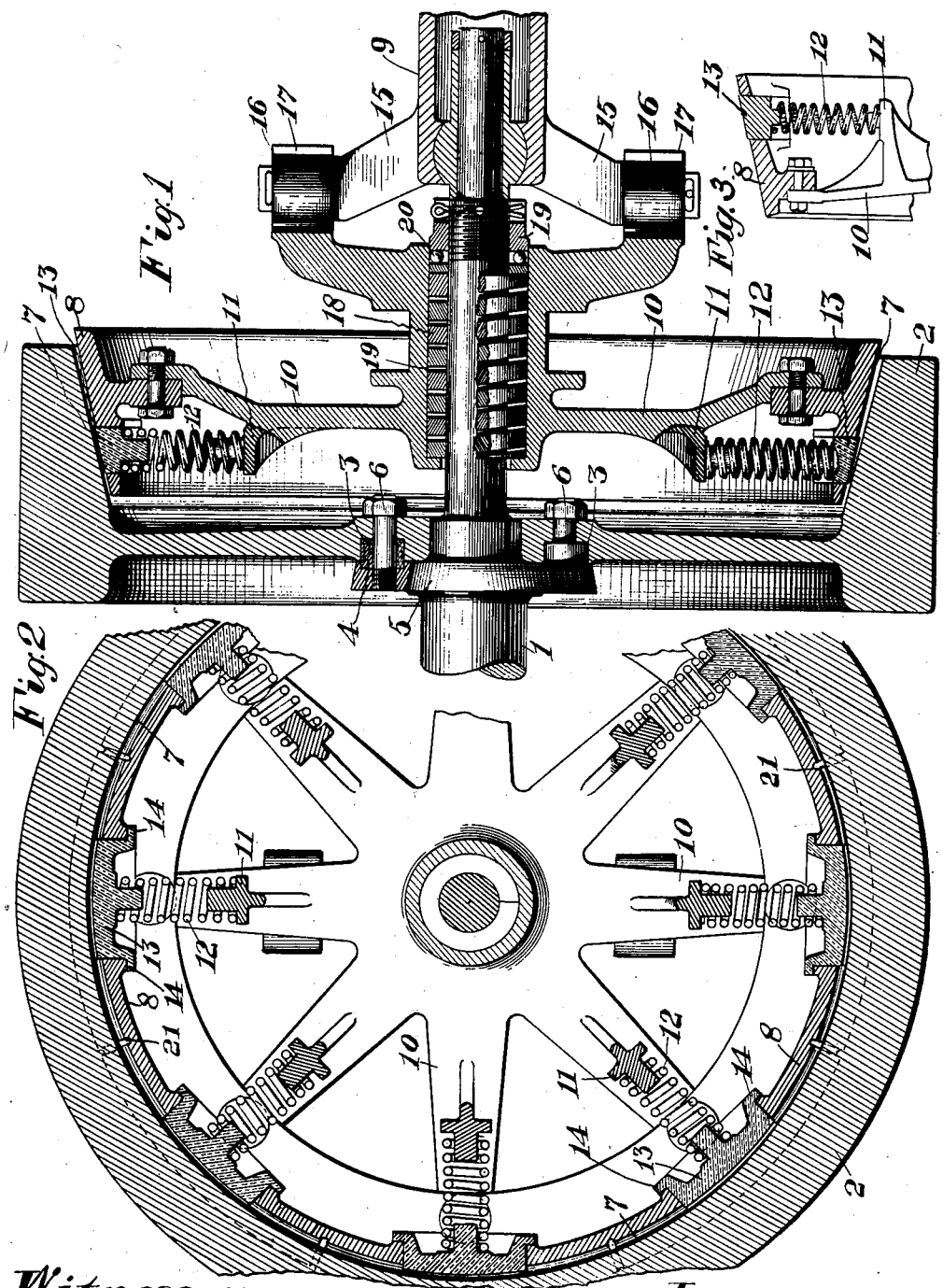

FRED A. LAW, OF HARTFORD, CONNECTICUT, ASSIGNOR, BY MESNE ASSIGNMENTS, TO THE COLUMBIA MOTOR CAR COMPANY, OF HARTFORD, CONNECTICUT, A CORPORATION OF CONNECTICUT.

CLUTCH.

1,009,424. Specification of Letters Patent. Patented Nov. 21, 1911.

Application filed April 8, 1902. Serial No. 101,898.

*To all whom it may concern:*

Be it known that I, FRED A. LAW, a citizen of the United States, and resident of Hartford, in the county of Hartford and State of Connecticut, (whose post-office address is Hartford, Connecticut,) have made certain new and useful Inventions in Clutches, of which the following is a full, clear, and exact description, whereby any one skilled in the art may make and use the same.

The invention relates in general to clutches for coupling two sections of a shaft together, and more particularly to devices of this sort known in the art as "friction clutches." Ordinarily in devices of this class, it has been the practice to provide suitable clutch surfaces which may be positively thrown into position to engage coöperating clutch surfaces, and thus secure a more or less positive connection between the two sections of a shaft and the friction surfaces, or, one of the clutch members has either been tapered to engage a corresponding conical surface on the coöperating member, or, radial shoes have been provided which could be positively actuated and thrown into engagement with a coöperating friction member. In all of these forms of device, more or less of a shock is transmitted especially when the driven section of the shaft is under a heavy load. And where sufficient clutch surfaces are provided to give a positive drive between the two sections of the shaft, the liability of this shock is increased as it is then almost impossible to gradually bring the two surfaces of the clutch member into engagement to permit the driven section of the shaft to be picked up by the driving section.

It is the object of the present invention to provide a clutch of the general class known as friction clutches in which the driven shaft will be picked up easily and without shock by the driving shaft, and this without the liability of wearing and destroying the clutch surfaces.

A further object of the invention is to simplify all parts of the structure and economize in space and to so inclose all the special actuating parts of the mechanism that there will be little or no liability of injury from dirt or other causes including wear of parts or tendency to bind due to straining to abnormal positions.

Referring to the drawings:—Figure 1 is a detail view in vertical section of the device with the parts broken away to show the construction. Fig. 2 is a sectional view through the clutch mechanism substantially at right angles to the plane of section of Fig. 1. Fig. 3 is a detail view through the medial line of one of the shoes, showing a modified arrangement of the parts shown in Figs. 1 and 2.

While the device herein shown is not limited in its uses to any particular form of driving mechanism and may be used with equal facility upon any two sections of a shaft, which it is desired to connect and disconnect, it is herein shown in connection with the fly-wheel of an engine and is particularly designed for use in connection with an engine or motor of the internal combustion type such as is commonly used upon road vehicles.

The clutches used in connection with self-propelled vehicles for connecting and disconnecting the engine or motor from the driving axle, are subjected to unusually hard usage, inasmuch as a vehicle often has to be started from a position of rest with the engine or motor running at a comparatively high speed, and under these conditions, unless special clutch mechanism is provided, there is a liability of incurring such shocks and strains in starting the carriage as will be most injurious to the operating mechanism as well as extremely disagreeable to the occupant. The evenness of operation or engagement is insured by preserving the engaging parts concentric and avoiding their being thrown out of concentricity by relative bending or flexing of the driven shaft at the connection or otherwise.

Referring to the drawings the numeral 1 denotes the driving shaft to which is secured the fly-wheel 2. This fly-wheel is provided with a suitable hub within which are arranged recesses 3 adapted to receive thimbles or nipples 4 which extend beyond the surface of the hub and into corresponding recesses formed in a flange 5 upon the driving shaft. Bolts 6 secure the parts together, and by this construction, the thimbles or nipples with the bolts 6, provide ample bearing between the parts to prevent shearing of the parts. The inner surface of the fly-wheel 2 is tapered to conical form and provides a clutch surface 7 which coöperates with a cone member 8 operatively connected with a driven shaft 9 by flexible means. The cone 8 is suitably secured to the spider 10, which is provided with ledges 11 forming suitable abutments for one end of a series of spiral springs 12 which at their opposite ends bear against friction shoes 13. These shoes 13 are arranged within the cone 8, and may be of any desired number to provide the requisite amount of surface for properly engaging the clutch surface of the fly-wheel 2. As shown in the drawings, there are eight of these friction shoes, and each projects slightly beyond the periphery of the cone 8, when said cone is out of engagement with its coöperating clutch surface. The surface of these eight shoes is concentric with the surface of the cone, and suitable stops preferably formed integral with the shoes as 14, prevent the friction shoes projecting beyond the periphery of the cone beyond certain predetermined limits.

The end of the driven shaft 9 bears a pair of arms or equivalent means as 15, upon which are mounted anti-friction bearings 16 coöperating with a slotted member 17 secured to and preferably integral with the spider 10. Furthermore a flexing or bending movement of driven shaft 9 with relation to the clutch as a whole, is permitted by the construction shown, in which the ball and socket joint preserves the driven shaft 9 central upon or with relation to the clutch, but permits flexibility, while the arms 19 engaging with the slot 17 on the spider, give a proper purchase for the driving shaft effort, but permit relative movement of flexure of the driven shaft, while the anti-friction bearing 16 prevents the loss of power in relative movement of arms 15 in the slot, as the anti-friction means shown bear on one side of the slots or the other side depending upon the positive or negative driving and therefore roll on the sides of the slot when relative movement is caused, either by moving the clutch member in or out of engagement or during normal rotation when driven shaft 9 is bent relatively to the clutch mechanism. By this arrangement, an axial movement of the spider and its cone clutch and clutch shoes is permitted, although a spring 18 is provided for normally holding the clutch surfaces in engagement. Any convenient means may be used for withdrawing the cone 8 and appurtenant parts from the fly-wheel 2 against the tension of the spring 18. The spring 18 is arranged within the recess 19 formed in the hub of the spider, and provides the bearing surface between said spider and the shaft 1. A suitable adjustment for determining the tension of the spring 18 is provided in a nut 19 threaded upon the end of the shaft 1 and having a thrust bearing of the antifriction type 20, interposed between it and the end of the actuating spring 18. There is a special reason for arranging the actuating spring within a practically closed recess in the hub of the spider, inasmuch as there is very little liability of this spring becoming distorted or being subjected to the injurious effects of grit and dirt. It will be noted that the spring is entirely inclosed and so formed and held that there is practically no opportunity of its becoming damaged or overstrained, and thus made unfit for use.

To insure a clean and bright surface between the contacting parts of the clutch at all times, a series of grooves are cut in one of the engaging members as at 21 and while these grooves are shown as formed in the surface of the conical member 8, they might equally well be formed in the clutch surface of the fly-wheel 2, although the same benefits are not obtained, as there is a tendency for foreign matter to accumulate upon the periphery of the cone surface of the fly-wheel 2 due to its rapid rotation, and the grooves 21 when formed in the cone 8 will effectually clear this surface of foreign material.

As shown in Fig. 1 of the drawings, the driven shaft 9 is provided with a spherical recess in which a spherical enlargement engages thus forming a ball and socket joint.

Obviously, the details of the mechanism herein described might be changed without at all altering the purposes or the intention of the invention, and the relative position and arrangement of the parts might be varied to suit the exigencies of any particular case.

What I do claim as my invention and desire to secure by Letters Patent is—

1. The combination of a pair of friction clutch surfaces respectively embodied in a main clutch member and a second clutch member, means for moving said surfaces into and out of complete engagement with each other, and independent driving friction clutch surfaces including members projecting through the main clutch member adapted to engage before the engagement of the first named surfaces.

2. In combination with a sectional shaft, a friction clutch surface borne upon one section, a coöperating friction clutch surface adapted to positively unite the two sections when brought into complete engagement with the first named clutch member, and a series of driving and friction clutch surfaces intermediate of the two clutch members actuated by means projecting through one of said clutch surfaces.

3. In combination with a sectional shaft, a friction clutch member borne upon one section of the shaft, a coöperating friction clutch member adapted to engage the first named member and provided with a plurality of driving friction clutch surfaces, one of which surfaces engages the coöperating clutch member in advance of the others, yielding means causing that clutch surface which engages in advance to project through and yieldingly beyond the surrounding driving and friction clutch surface.

4. In combination, a divided shaft, a main friction clutch member operatively mounted upon one section of said shaft a flange therefor, a coöperating friction clutch member adapted to completely engage said member and positively unite the two sections of the shaft, and frictional driving means including a yielding member inside of the main clutch flange for securing a partial driving effect between the shaft sections before the main clutch surfaces are brought into complete engagement.

5. In combination in a friction clutch, a driving cone, a driven cone and a series of spring sustained clutch members projecting through one of said members and adapted to couple said cones, and means for completely engaging the cone surfaces.

6. In combination in a friction clutch, a frictional driving member, a frictional driven member, resilient means for forcing said members together, said means forming the bearing to permit relative rotation of the driving and driven members.

7. In combination in a clutch mechanism, a driving member and a driven member, a spring adapted to force said members into positive engagement, said spring being retained within the hub of one of the members and providing a bearing for rotation of said member.

8. The combination of a pair of friction clutch surfaces, means for bringing said surfaces into and out of engagement with each other, means supported with one of said clutch surfaces and capable of movement relatively therewith whereby in one position a portion only of one of said friction surfaces is in driving contact and in another position said portion is flush with the remaining driving surface.

9. In combination with a sectional shaft, a clutch surface borne upon one section, a coöperating clutch surface adapted to frictionally unite the two sections when brought into engagement and a series of surfaces protruding normally slightly beyond one of the main clutch surfaces surrounded on all sides by the main clutch surface and arranged to act upon the other clutch surface.

10. In combination with a sectional shaft, a clutch member borne upon one section of the shaft, a coöperating clutch member adapted to engage the first named member, having a main clutch surface and provided with a clutch surface arranged to normally protrude slightly beyond the first mentioned clutch surface in advance of engagement of the main surface, said slightly protruding surface constituting a pad intermediate the sides of said main surface and adapted to recede to a position where it becomes a flush continuation of the main surface surrounding it.

11. In combination with a sectional shaft, a frictional clutch member secured to one section, a second frictional clutch member rotatably mounted with relation to said section and having a hub with bifurcated extensions, projections on the other section of the shaft adapted to engage said bifurcated projections, and a ball and socket connection between the two sections of the shaft.

12. In combination with a sectional shaft, a friction clutch member secured to one of said sections, a spider rotarily mounted with relation thereto, a second friction clutch member concentrically arranged with relation to the spider and provided with orifices in its working face, clutch members projecting through said orifices and spring supported with relation thereto whereby a partial driving effect is secured between the two main clutch surfaces upon the engagement of the projecting surfaces, and connections between the spider and the second section of the shaft permitting only relative axial movement of the parts.

13. In combination with a friction clutch, a conical clutch surface, a coöperating conical clutch surface adapted to completely engage said first named clutch surface, and a plurality of driving clutch members projecting through one of the conical clutch members and adapted when the parts are in full engagement to form a part of the conical surface of said clutch member.

14. In a clutch mechanism, in combination, a driving member and a driven member, friction clutch surfaces arranged to connect and disconnect said members, a plurality of independent clutch surfaces arranged to project radially through one of said frictional clutch surfaces whereby a partial and varying driving effort is secured before the complete engagement of said frictional clutch surfaces.

15. In combination in a clutch, a fly wheel having a beveled surface on the inner side of its rim, a shaft supporting said fly wheel and projecting into a second clutch member, said second clutch member having a beveled surface adapted to engage the fly wheel and having arms forming a flexible coupling, a second shaft engaging said clutch member coupling and affording a flexible connection between said second shaft member and the first shaft member.

16. The combination in a clutch, of a shaft, a member with a beveled clutch surface supported thereby, a second member movable relatively thereto in the direction of the axis of the shaft, spring actuated means moving said clutch members axially of said shaft, other spring actuated members operating radially from said shaft, a sectional clutch surface operated by the latter.

17. In combination in a clutch, of a clutch member and frictional surfaces fastened thereon, a shaft supporting said member, a second clutch member with a friction surface for engagement with the first and secondary contact surfaces in conjunction therewith actuated by springs radially with relation to said shaft, a spring operating axially of said shaft to normally hold the clutch members in engagement.

18. A friction clutch consisting of two members provided with bearing or friction faces, one of said members having a supplemental or yielding surface normally protruding slightly beyond its main friction face, and adapted to recede to a position flush with the bearing or friction face of one of said members and operating means to cause the engagement of the supplemental surface alone or in conjunction with and cooperating to form a part of the entire clutch surface.

19. In combination with a clutch, a main clutch driving member, a driven shaft section, an intermediate driven clutch member, bifurcated arms on said driven clutch member, projections on said driven shaft member adapted to engage with said bifurcated arms on the second clutch member and interconnections between said bifurcated arms and said projections including anti-friction devices.

20. In combination in a sectional shaft, a driven member and a driving member, flexible means of engagement between the driving member and the driven member, a third member surrounding one of said members and having interconnections with the other member whereby it may be moved longitudinally on the member it surrounds and transmit driving effort to the other member, said interconnections including slots and engaging stubs or arms.

21. In combination with a clutch, inter-engaging frictional clutch members, a section of a shaft coupling embodied with one of said clutch members, a second shaft section, interconnecting means between said shaft section permitting relative flexibility and including arms on one of said sections with slots on the ends of said arms.

22. In combination, a driving shaft, a fly wheel, driving clutch member, a driven shaft, an intermediate section embodying a clutch member, adapted to engage with the driving clutch member, a spring between the fly wheel and the driven shaft, a hub on said intermediate member inclosing said spring means on said hub for engaging one end of said spring, a projection on the driven shaft carrying means for engaging the other end of said spring.

23. In combination, a frictional clutch operating mechanism and a shaft coupling, two shaft sections interconnected by said coupling, one of said shaft sections and its coupling means embodied in one of the members of said friction clutch, means for longitudinally moving said friction clutch member and its shaft coupling means, and slotted connection between said shaft sections, anti-friction means on the other shaft section adapted to engage and move in said slot.

24. In combination in a friction clutch, a driving member and a driven member each having a friction clutch surface, an axial projection on the driving member, a hub on said driven member surrounding the projection on the driving member, a spring adapted to force said members into positive engagement, said spring being retained within the hub of said driven member.

25. In combination in a friction clutch, a driving member, a driven member, an axial projecton on said driving member, a hub on said driven member surrounding the axial projection of the driving member, a spring adapted to force the driven member into engagement with the driving member restrained at one end by the hub of the driven member and at the other end restrained by an anti-friction thrust bearing detachably secured on the projection of the driven member.

26. In combination, a clutch and shaft coupling, a driving clutch member, a driven shaft section, an intermediate member combining a driven clutch member and a driving shaft section and including a hub, an axial projection on said driving clutch member located between the driven shaft section and the clutch member and embraced by the hub of the intermediate member, a detachable abutment on said projection, a spring restrained between an engagement with said hub and said detachable abutment.

27. In combination in a friction clutch, a driving and a driven member, means for moving said members into and out of engagement with each other, independent clutch driving surfaces borne by one of said parts including pads projecting slightly above the surface and through the surface of one of said parts and adapted to engage the single clutch surface of the opposite part and means permitting said independent clutch surfaces to recede and permit the driven member to engage the same clutch surface on the driving member as is engaged by the independent clutch surfaces.

28. The combination in a clutch mechanism, a driving member and a driven member, a pair of friction clutch surfaces, means for moving said surfaces into and out of engagement with each other, detachable and attachable supplementary pads projecting through one of said surfaces, spring actuated means removed from the actual frictional surfaces of said supplementary pads.

This specification signed and witnessed this 12th day of February, A. D. 1902.

FRED A. LAW.

In the presence of—
  HENRY L. SMITH,
  FRANK W. WESTERVELT.